(12) United States Patent
Herb

(10) Patent No.: US 7,044,701 B2
(45) Date of Patent: May 16, 2006

(54) FASTENING SYSTEM

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/728,252

(22) Filed: Dec. 4, 2003

(65) Prior Publication Data

US 2004/0165964 A1 Aug. 26, 2004

(30) Foreign Application Priority Data

Dec. 5, 2002 (DE) ............... 102 56 859

(51) Int. Cl.
*F16B 27/00* (2006.01)
*F16B 21/00* (2006.01)

(52) U.S. Cl. ............... 411/84; 411/485; 411/549; 411/349; 411/550; 411/551; 411/552; 411/553

(58) Field of Classification Search ............... 411/485, 411/549, 349, 550, 551, 552, 553, 84; 292/129, 292/224, 229, 209, 204, 197
See application file for complete search history.

(56) References Cited

U.S. PATENT DOCUMENTS

| | | | | | |
|---|---|---|---|---|---|
| 2,886,872 | A | * | 5/1959 | D Amelio ............... | 411/554 |
| 3,483,910 | A | * | 12/1969 | Van Huffel et al. ......... | 411/112 |
| 3,493,025 | A | * | 2/1970 | Van Huffel et al. ......... | 411/103 |
| 4,263,952 | A | * | 4/1981 | Kowalski ............... | 411/112 |
| 4,285,379 | A | * | 8/1981 | Kowalski ............... | 411/85 |
| 4,460,299 | A | * | 7/1984 | Kowalski ............... | 411/85 |
| 4,545,697 | A | * | 10/1985 | Verdenne et al. ........... | 403/230 |
| 4,575,295 | A | * | 3/1986 | Rebentisch ............... | 411/85 |
| 4,645,393 | A | * | 2/1987 | Pletcher ............... | 411/84 |
| 4,830,531 | A | * | 5/1989 | Condit et al. ............... | 403/348 |
| 4,917,553 | A | * | 4/1990 | Muller ............... | 411/85 |
| 5,209,619 | A | * | 5/1993 | Rinderer ............... | 411/85 |
| 5,271,586 | A | * | 12/1993 | Schmidt ............... | 248/58 |
| 5,372,341 | A | * | 12/1994 | Witherbee et al. ............ | 248/49 |
| 5,489,173 | A | * | 2/1996 | Hofle ............... | 411/85 |
| 5,628,598 | A | * | 5/1997 | Hofle ............... | 411/85 |
| 5,655,865 | A | * | 8/1997 | Plank et al. ............... | 411/85 |
| 2004/0165965 | A1 | * | 8/2004 | Unverzagt et al. ............ | 411/84 |

* cited by examiner

*Primary Examiner*—Robert J. Sandy
*Assistant Examiner*—David Reese
(74) *Attorney, Agent, or Firm*—Abelman, Frayne & Schwab (57) ABSTRACT

A fastening system (1) comprises a rear grip part (5) for introduction into a mounting opening (4) of an elongated mounting rail (2) in a first position and for gripping behind the mounting projections (6.1, 6.2) in a second position and a stop (3) for frontal external loading of the mounting rail (2). The stop (3) is connected to the rear grip part (5) by means of a threaded bolt (9). In addition, on the fastening system (1) a system is provided for providing a relative rotary movement between the stop (3) and the rear grip part (5) about the axis of the bolt (9). The system is configured as a transmission system for transforming a translatory movement of the bolt (9) relative to the stop (3) into a rotary movement of the rear grip part (5) relative to the stop (3).

4 Claims, 6 Drawing Sheets

FASTENING SYSTEM

BACKGROUND OF THE INVENTION

1. Technical Field

The invention relates to a fastening system with a rear grip element for introduction in a first position into a mounting opening of a elongated hollow body and in a second position for rear gripping mounting projections arranged in the hollow body, as well as having at least one stop for frontal external contact of the edges abutting the hollow body longitudinal walls. The stop is connected with the rear grip element by means of a fastening element. A device for introducing a relative rotary movement is provided between the stop and the rear grip element about the axis of the fastening elements.

2. Description of the Prior Art

Fastening systems of the above type are known for fastening of an object, for example, to C-shaped mounting rail fixed to a surface. The fastening system is introduced into the mounting opening of the mounting rail and rotated, for example, by an angle of 90°. When this is done the rear grip part of the fastening system grips the mounting projections in the mounting rail. Accordingly, it is possible to displace the fastening system in the longitudinal direction of the mounting rail to a final position on the mounting rail. In order to effect a fastening of the fastening system on the mounting rail, the rear grip part is clamped against the stop, for example, using a threaded bar, tightened and thus affixed to the mounting projections. This type of fastening system is suitable for fastening elongated objects and conduit lines, such as pipelines or the like. This type of fastening system is, for example, known from DE 197 36 933 A1.

For fastening a conduit line to a hollow body a number of fastening systems are placed in the hollow body. On the one hand, in order to accelerate the setting operation of the individual fastening systems and to assure in each fastening system perfect orientation of the rear grip part, an anchoring unit is proposed in DE 196 17 750 C1, wherein the rear grip part connected rotationally with the stop, between the stop and grip part a reset spring is provided that can be tensioned by rotation of these two parts relative to each other. The reset spring creates a resetting force when rotated. Rotary limitation stops are provided at the stop. As soon as the rear grip part is situated on the inside of the hollow body at the time of the setting operation of the anchoring unit, the later is oriented for rear gripping of the edges of the hollow body by the reset force of the reset spring.

The drawback of the known solution is that the anchoring unit must be further rotated after introduction through the mounting opening of the mounting rail by a specific angle, in order to optimally grip the mounting projections. Especially at difficult to access locations, this circumstance is a drawback when mounting the anchoring unit.

SUMMARY OF THE INVENTION

The object of the present invention is to provide a fastening system having a rotatable rear grip part, which makes it possible to pre-fix the fastening system to a hollow body without a rotaton about a specific angle, wherein a correct positioning of the rear grip part is secured with the mounting projections. Further, the fastening system can be economically manufactured and allow simple assembly.

According to the invention, a fastening system comprises a rear grip part for introduction into a mounting opening of a hollow body in a first position and for rear gripping of mounting projections provided in the hollow body in a second position, as well as at least one stop for frontal outer contact of the edges of the hollow body longitudinal walls adjacent to the mounting opening. The stop is connected to the rear grip part by means of a fastening means. A system for introducing a relative rotary movement is provided between the stop and the rear grip about the axis of the fastening means. The system is configured as a transmission system for transforming a translatory movement of the fastening means relative to the stop into a rotary movement of the rear grip relative to the stop.

By means of the transmission system a pressure movement on the fastening means is sufficient, for example, in order to fix the fastening system, introduced into the hollow body through the mounting opening, on the hollow body. The transmission system determines the degree of conversion of the translatory movement into a rotary movement, whereby the rotation of the rear grip part relative to the mounting opening is defined. The positioning of the rear grip part is defined by an elastically contacted element and the transmission system. Accordingly, the orientation of the rear grip part is allowed even in the case of an imprecise construction of the hollow body. The user has the security, that the rear grip part is correctly oriented relative to the rear gripping of the rear grip part. A rotation, for example, of the stop or the fastener means is eliminated, whereby the fastening system according to the invention can be used also in difficult to access places. Then, by means of the fastening means, the fastening system is tensioned and detachably fixed to the hollow body. If the fastening system according to the invention is arranged in a mounting opening configured as an elongated opening or a C-shaped mounting opening, the fastening system can, after preliminary fixation, be displaced along the elongation direction of the hollow body and clamped in the desired position with the hollow body by means of the fastening means.

Preferably, the transmission system comprises a slotted member and an elastically loaded element, whereby the elastically loaded element engages in the slotted member of the transmission system. The slotted member forms the guide and defines the degree of the resulting rotational movement of the rear grip part resulting from the translational movement of the fastening means. The elastically loaded element grips the guide of the slotted member. By virtue of the elastic loading of this element, for example, the slotted member has a variable of this element, the slotted member can, for example, have a varying extent in the radial direction relative to the fastening means, without the contact between the slotted member and the element engaging in the slotted member being interrupted during the entire rotary movement.

Preferably, the slotted member of the transmission system has an inclination that runs from the first position of the fastening system into the second position. The first position is a so-called transport position, in which the fastening system is transported, engaged and introduced into the mounting opening of the hollow body. The second position is, for example, the securing position in which the rear grip part of the fastening system is arranged for rear gripping of the mounting projections provided in the hollow body. In order to provide perfect alignment of the rear grip part in the setting operation of the fastening system it is advantageous in particular for reasons of structural design, when the rotational movement at the start is stronger than at the end. Furthermore, the user is sensibly informed by virtue of this design of the slotted member, that the rear grip part is oriented for rear gripping of the mounting projections.

By virtue of the inclination of the slotted member the rotational angle can be controlled over the entire range of the slotted member. For example, a constant inclination is provided on the slotted member.

Advantageously, the rear grip part has a shaft oriented in the direction of the stop, whereby the slotted member of the transmission system on the shaft is formed, optionally as a groove, whereby the slotted member comprises a flattened or planar zone. The slotted member can be milled on the shaft, or can be formed using a laser. The base of the slotted member, for example, by virtue of an increasing or decreasing depth of the groove, forms a slope on the shaft. Due to the configuration of the slotted member as a groove the guide of the elastic loaded element is assured. An unintended sliding out of the elastically loaded element out of the slotted member is largely excluded in this design. The flattening represents essentially a changeover in the slope, which reduces rotational movement of the rear grip part prior to reaching the second, or the safety position relative to the initial rotation when introducing the rotational movement.

In one variant according to the arrangement of the shaft on the rear grip part, the stop has a shaft oriented in the direction of the rear grip part, wherein the slotted member of the transmission system on the shaft is optionally configured as a groove, wherein the slotted member has a planar surface.

The shaft, if it is provided on the rear grip or on the stop, makes possible, with a minor adjustment of the fastening system, a wide range of applications of the fastening system for arrangement on variously shaped hollow bodies. For example, in the case of C-shaped mounting rails the mounting projections are formed by deflecting the free ends inwardly of the side walls running parallel to each other. The mounting projections have different dimensions, depending on the manufacturer, the material used or size of the mounting rail. Instead of providing a plurality of fastening systems matched to the various types of mounting rails, using a small number of fastening systems having parts provided with the shaft, this variety of mounting rail as well as other hollow bodies can be covered. If the shaft is configured on the rear grip part, the rear grip part is selected as a factor of the extent of the coverage of the mounting projections in the direction of setting of the fastening system. With an arrangement of the shaft on the stop the latter is correspondingly replaced. This embodiment of the fastening system according to the invention reduces the costs appreciably relative to the known embodiments of fastening systems, since no longer does a fastening system precisely matched to each type and form of hollow body need to be provided.

Advantageously, the change in the inclination to the planar part is 5° to 50°, preferably 15° to 45°. To this end, the sensory perception of the user is enhanced with regard to the orientation of the rear grip part in the hollow body at the time of the setting operation of the fastening system according to the invention.

Preferably, the groove and/or the planar surfacre is shaped to be helicoidal on the shaft. In this embodiment, along with the rotary movement a translatory movement of the rear grip part is made. Accordingly, the distance between the rear grip part and the stop in the first position or transport position is configured less than the extension of the mounting projections in the sense of the setting direction of the fastening system. The pitch of the helicoidal groove and/or the planar surface defines the path of the translatory movement of the rear grip part. The pitch must correspond at least to the difference between the distance between the rear grip part and the stop and the extension of the rear grip parts in the second position so that the rear grip part in the second position or in the secured position can grip behind the mounting projections.

Preferably, the transmission system has at least two, preferably diametrically opposed slotted members, wherein each slotted member is engaged by an elastically loaded element. With two slotted members a high degree of fitness for the purpose of the fastening system is provided, since an undesirable cant when operating the transmission system is substantially avoided. This is particularly advantageous, when the fastening system is used multiple times.

Advantageously, a pitch is provided in at least one of the slotted members of the transmission system upstream of the inclination. By virtue of the inclination, two advantages are provided. On the one hand the inclination prevents accidental operation or autonomous operation of the fastening system in the transport position. And on the other hand, the sensory feedback upon operating the fastening system provided to the user is enhanced. In order that the rotary movement is initiated in the desired direction of rotation, the initial resistance caused by the pitch must be overcome at the time of initiating the translatory movement. Since the pressure for initiating of the translatory movement is not immediately reduced on the fastening means after overcoming the pitch as a result of the reaction speed of the user, as a result of the resulting rotary movement of the rear grip part makes possible the rear gripping of the mounting projections by the rear grip part. An inadequate orientation of the rear grip part relative to the mounting projections, for example by virtue of an ineffective operation of the fastening means, is substantially excluded.

Preferably, the transmission system comprises at least two slotted member segments, wherein the first slotted member segment has an axially increasing inclination and the at least one additional slotted member segment has an inclination oriented opposite to that of the first slotted member segment, wherein the second slotted member segment abuts the first slotted member segment. The rear grip part is guided into the interior of the hollow body with the first slotted member segment so that the distance between the rear grip part and the stop is increased up to reaching the extent of the mounting projection to be rear gripped and rotated under the mounting projections. The changeover from the first slotted member segment to the second slotted member segment represents a bend or a inflection point. The rear grip part is, if necessary, further rotated under the mounting projections by means of the guide in the second slotted member segment; however, the distance between the rear grip part and the stop is preferably continuously reduced until the rear grip part securely grips behind the mounting projections.

Preferably, the at least one further slotted member segment runs parallel to the axis of the fastening element. If the first slotted member segment is so configured that the rear grip part has reached the desired position for gripping behind the mounting projections upon reaching the bend or the inflection point of the slotted member, the second slotted member segment serves only in the reduction of the distance between the rear grip part to the stop.

Advantageously, the rear grip part is connected by a threaded bolt with the stop, whereby the rear grip part is friction—lockingly or force—lockingly engaged with the stop rotatably connected with the bolt, whereby the bolt has a torque transmission means at its end facing away from the rear grip part, with such means radially overlapping the stop at least in part. The fastening means comprises, for example, a threaded bolt with a hexagonal head.

Preferably, the elastically loaded element is a spring-biased element and comprises a spring-biased guide tip, optionally a spring clip. The elastically loaded element is, for example, arranged on the stop, when the slotted member is provided on the rear grip part. Accordingly, the elastically loaded element is preferably arranged on the rear grip part, if the slotted member is provided on the stop. The elastically loaded element is fixedly arranged on the corresponding part, so that a movement, for example of the spring-biased guide tip, is possible for engaging the slotted member but the elastically loaded element cannot come loose from the part of the fastening system on which it is arranged. A preferably inwardly pre-stressed spring clip can work unlaterally to the engagement in the slotted member or, preferably, two diametrically opposed slotted members can engage as a one-piece element. In particular in the case of the design of the rear grip part or of the stop having one shaft and two slotted members arranged diametrically opposing each other and on the shaft, a preferably substantially U-shaped spring clip is provided as the elastically loaded element.

Preferably, a spring loaded element is provided between the fastening system and the stop. The spring-loaded element is, for example, a flat spring having an opening for passing through of the fastening means, whose free end rests on the stop. A metal bolt is preferably used as the fastening means, whose head projects radially beyond the diameter of its threaded zone. Accordingly, upon pressing down the fastening system the flat spring is loaded; by releasing the pressure on the fastening means the spring is released and lifts the fastening means as well as the rear grip part arranged inside the hollow body until the rear grip part engages the mounting projections. This embodiment is particularly advantageous for the arrangement of the fastening system on a C-shaped mounting rail. The fastening system situated in the secured position can disengage the rear grip part from the mounting projections by again pressing on the fastening means and repositioned along the mounting opening in the elongated direction of the mounting rail.

Other advantageous embodiments and combinations of features of the invention will become apparent from the following detailed description and the set of patent claims.

BRIEF DESCRIPTION OF THE DRAWINGS

FIG. 2a represents a cross-section through the slotted member design of the first exemplary embodiment along the line IIa—IIa of FIG. 1a;

DETAILED DESCRIPTION OF THE INVENTION

In principle, in the figures identical parts are identified using identical reference numerals.

Figure 1A:
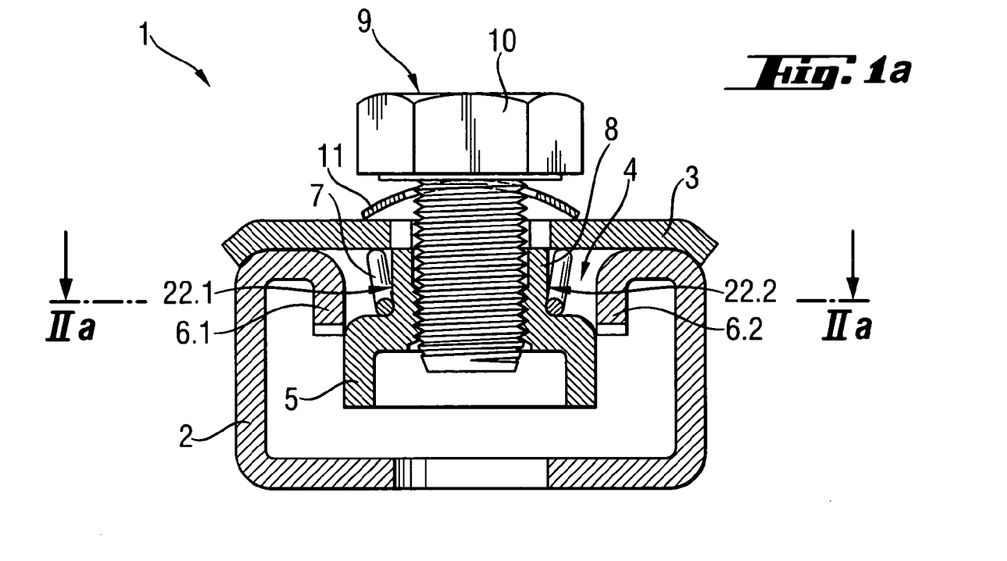
FIG. 1a–d represents a first exemplary embodiment of the fastening system according to the invention in four individual steps of the setting operation shown in cross-section.

FIGS. 1a–d represents a first exemplary embodiment of the fastening system according to the invention in four individual steps of the setting operation. The fastening system 1 is represented in FIG. 1a after introduction into an elongated hollow body 2 shaped as a mounting rail. The stop 3 bears on the edges adjacent to the mounting opening, on the hollow body 2 shaped as a mounting rail. In this position the distance between the rear grip part 5 and the stop 3 is inadequate so that the rear grip part 5 cannot be rotated under the mounting projections 6.1 and 6.2 in this position.

A spring clip is provided as the spring-loaded element 7 between the stop 3 and the rear grip part 5, the element engaging in two diametrically opposed slotted members 22.1, 22.2 arranged on the shaft 8. The interplay between the spring clip and the slotted member(s) 22.1, 22.2 is described in detail below.

The rear grip part 5 is securely connected with the fastening means 9 configured as a threaded bolt, which is led through the stop 3. Between the bolt head acting as a torque transmission means 10 and the stop 3, a spring-loaded element 11 configured as a flat spring is provided on the upper surface of the hollow body.

Figure 1B:
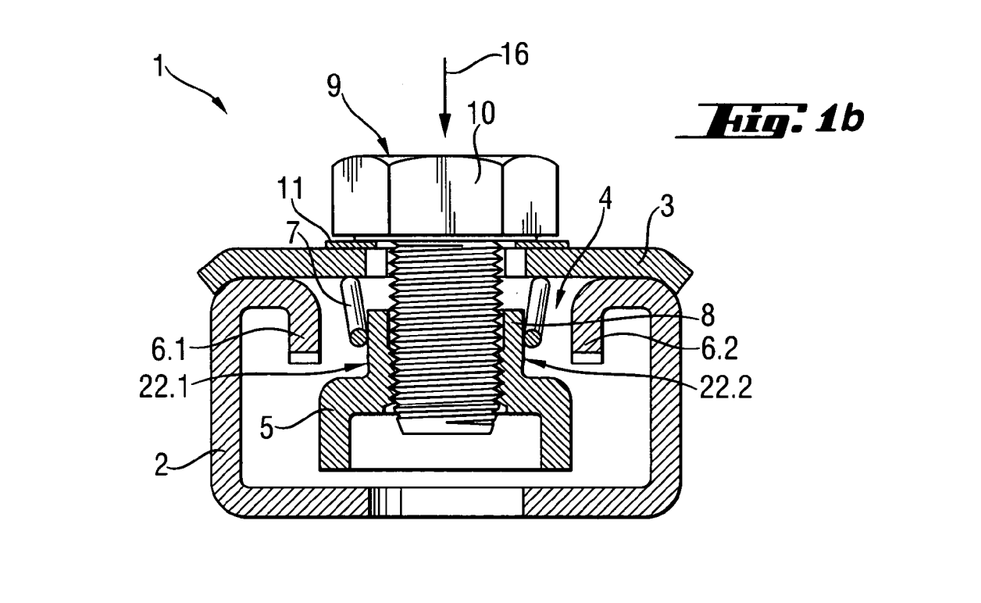

By exerting a pressure on the bolt head in the direction of the arrow 16 note FIG. 1b the rear grip part 5 of the fastening system 1 moves into the inside of the hollow body 2. The distance between the rear grip part 5 and the stop 3 is thus enlarged in such a fashion that the rear grip part 5 can grip behind the mounting projections 6.1 and 6.1 after it is rotated.

Figure 1C:
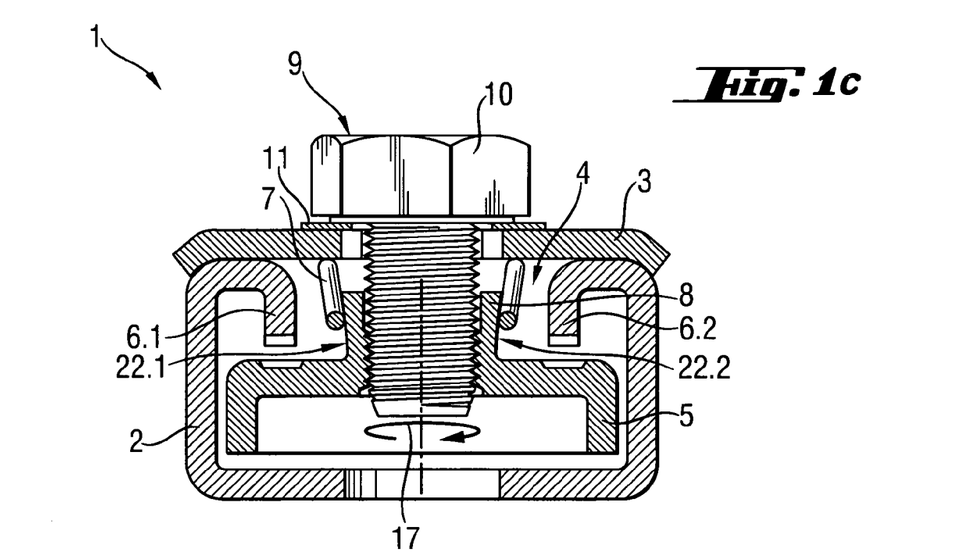

By virtue of the spring clip engaging the slotted members 22.1, 22.2 the rear grip part 5 rotates according to the design of the slotted members 22.1, 22.2 in the direction of the arrow. The rear grip part 5 arranged for gripping behind the mounting projections 6.1 and 6.2 is represented in FIG. 1c. The mounting projections 6.1 and 6.2 are with their free ends and the rear grip part 5 in the engagement zone with the mounting projections 6.1 and 6.2 for allowing an improved engagement with each other using an edge milling. At this point it is stated that the rear grip part 5, upon operating the bolt according to the design of the slotted members 22.1, 22.2 it moves continuously translatorily and rotationally; i.e. it is loosened. For a better understanding of the invention, the translatory movement of the rear grip part 5 is represented in FIG. 1b and the rotary movement is represented in FIG. 1c.

By releasing the pressure on the bolt it is, for example, lifted by the flat spring and the knurled zone of the rear grip part 5 engage in the milled parts on the mounting projections 6.1, 6.2. In order to reposition the fastening system 1 in the hollow body 2 configured as a mounting rail, pressure is reapplied to the bolt serving as the fastening means 9, whereby the engagement between the rear grip part 5 and the mounting projections 6.1 and 6.2 is released. This translatory movement preferably is not adequate to rotate the rear grip part 5 so that it no longer can be brought into engagement with the mounting projection 6.1 and 6.2. The fastening system 1, when the bolt is depressed along the mounting opening 4 is moved in the longitudinal direction of the mounting rail until the desired position of the fastening means 1 is reached in the mounting rail. By releasing the bolt, the rear grip part 5 again engages the mounting projections 6.1 and 6.2. By tightening the bolt, the rear grip part 5 clamps with the mounting projections 6.1 and 6.2 for fixing the fastening system 1.

Figure 2A:
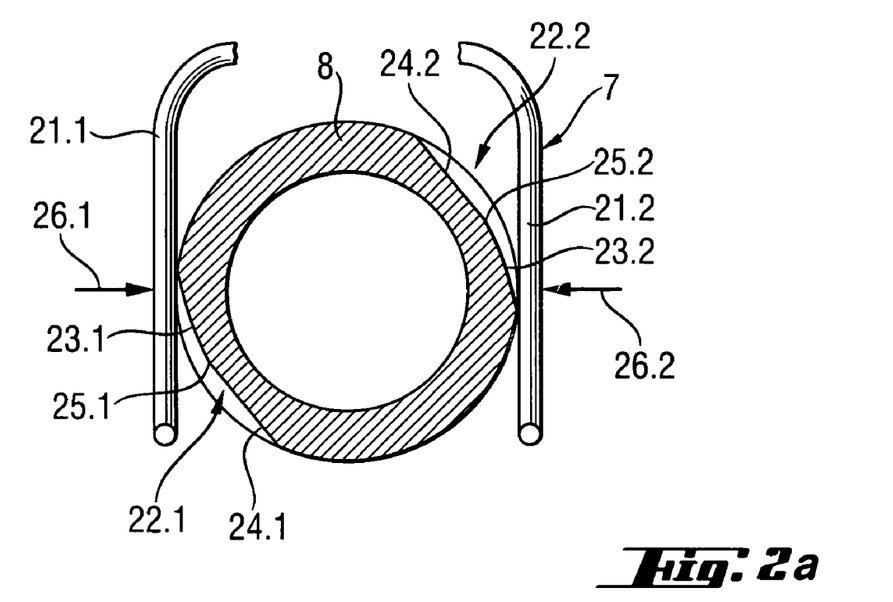

FIG. 2a represents a section through the slotted member design 22.1, 22.2 of the first exemplary embodiment along the line IIa—IIa of FIG. 1a. The spring clip serving as the spring-loaded element 7 is manufactured of spring steel so that the inwardly biased spring clip (acting in the direction of the arrow 26.1 and 26.2) are in continuous engagement with its members 21.1 and 21.2 with the slotted members 22.1 or 22.2. The slotted member 22.1 is decribed in detail in the following. The statements made in this regard apply accordingly to the slotted members 22.2 arranged diametrically opposing the slotted member 22.1.

The slotted member 22.1 runs axially along the shaft 8 increasingly and has an inclination 23.1 as well as a planar part 24.1. The inclination 23.1 serves in the conversion of the translatory movement of the fastening means 9 to a rotary movement of the rear grip part 5. Using the inclination 23.1 it is assured that at the start of the rotation of the rear grip part 5 is rotated more powerfully than towards the end of the rotary movement. The transition between the inclination 23.1 and the planar surface part 24.1 represent the bending point 25.1 of the slotted member 22.1. The bending point 25.1 is utilized by the user when setting the fastening system 1. Accordingly, the user is provided with the security that the rear grip part is oriented in order to grip behind the mounting projections of the mounting rails and can take the pressure from the bolt.

Figure 1D:
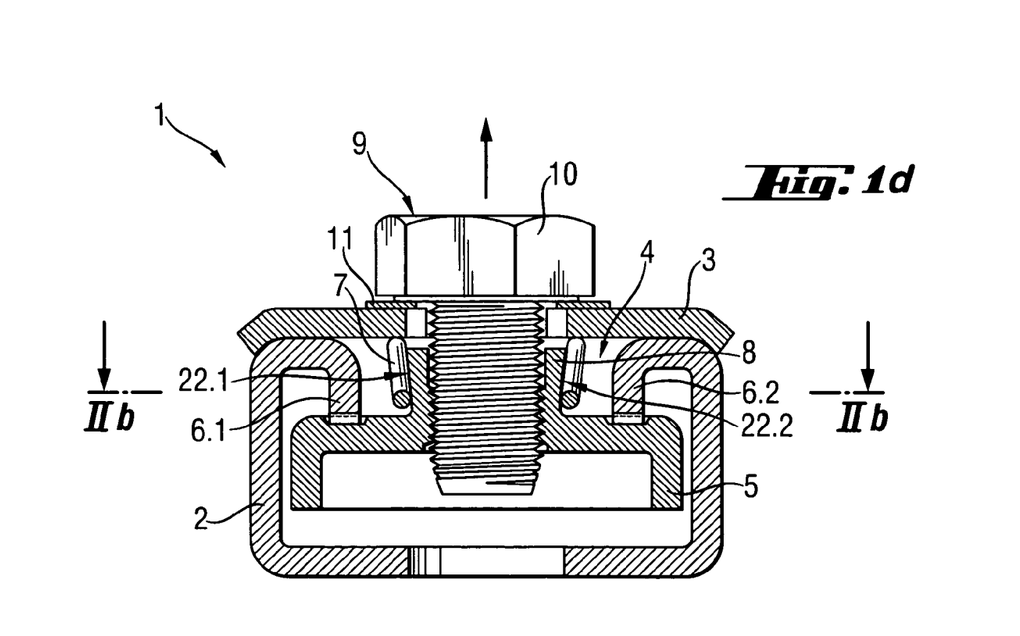
Figure 2B:
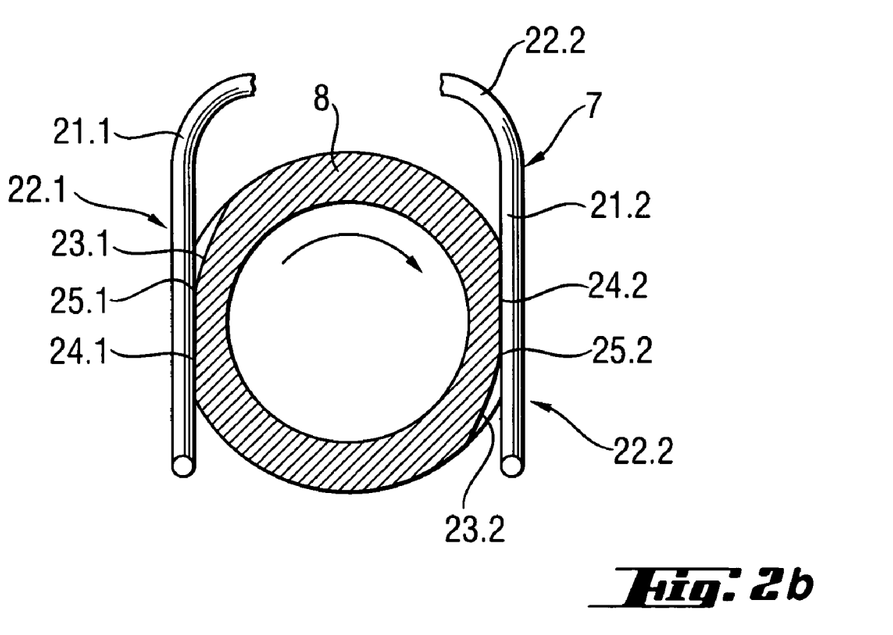
FIG. 2b represents a cross-section through the slotted member design of the first exemplary embodiment along the line IIb—IIb of FIG. 1d.

FIG. 2b represents a section through the slotted member design 22.1, 22.2 of the first exemplary embodiment along the line IIb—IIb in FIG. 1d. The planar surface part 24.1 or 24.2 is released vis-à-vis the inclination 23.1 or 23.2 in the angular range approximately 5° to 50°. The members 21.1 and 21.2 of the spring clip lie on the planar surface parts 24.1 and 24.2 so that the rear grip part 5 remains essentially in the intended orientation when tightening.

Figure 3A:
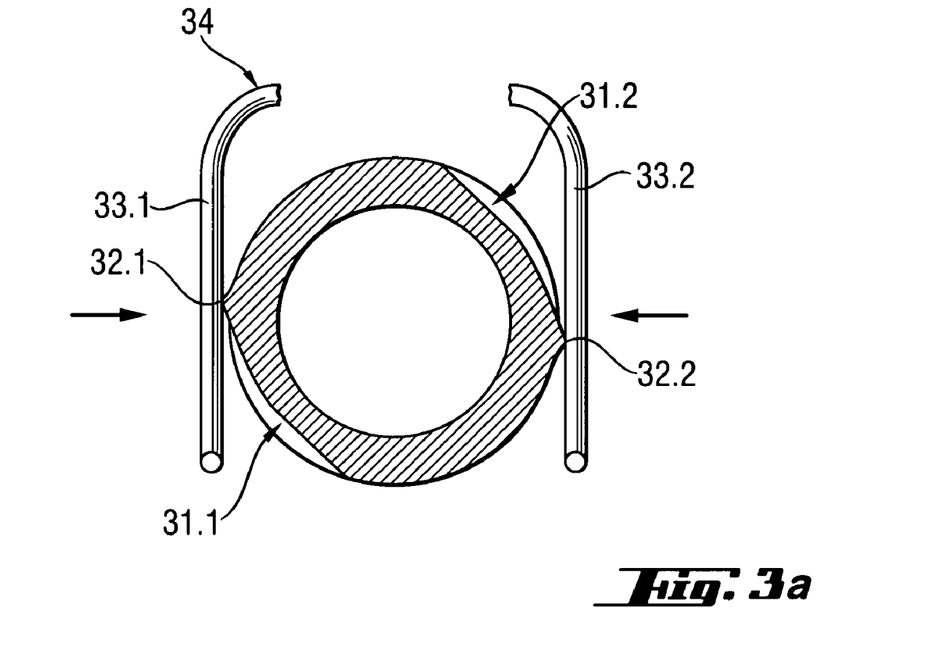
FIG. 3a, 3b each represents a cross-section through a variant of the slotted member represented in FIGS. 2a and b.
Figure 3B:
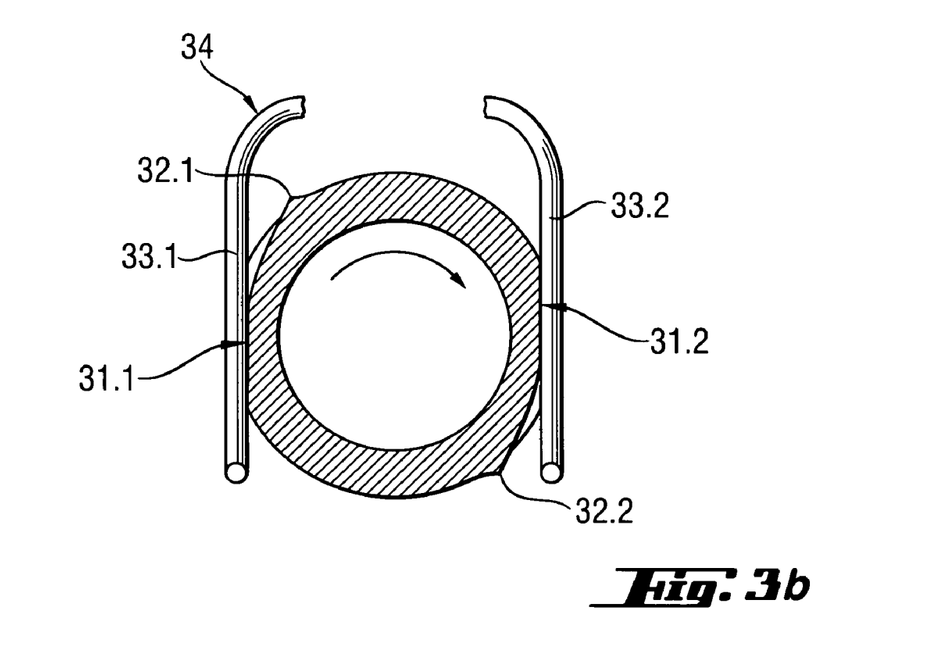

One section through a variant relative to the slotted design shown in FIGS. 2a and b is represented in FIGS. 3a and 3b. The slotted members 31.1 and 31.2 each have a cam 32.1 or 32.2 at which the members 33.1 and 33.2 of the spring clip 34 abut in the transport position of the fastening system. For introducing the rotary movement of the rear grip part, the initial resistance built up by the cams 32.1 and 32.2 must be overcome by pressure on the fastening means. This increased required pressure relative the required pressure of FIGS. 2a and 2b for introduction of the rotary movement of the rear grip part rotates the rear grip part after overcoming the resistance resulting from the design of the slotted members 31.1 and 31.2. Apart from the arrangement of the cam serving as the inclination 32.1 and 32.2 the slotted members 31.1 and 31.2 are configured essentially identically to the slotted members 22.1 and 22.2 shown in FIGS. 2a and 2b and have the same mode of operation.

Figure 4:
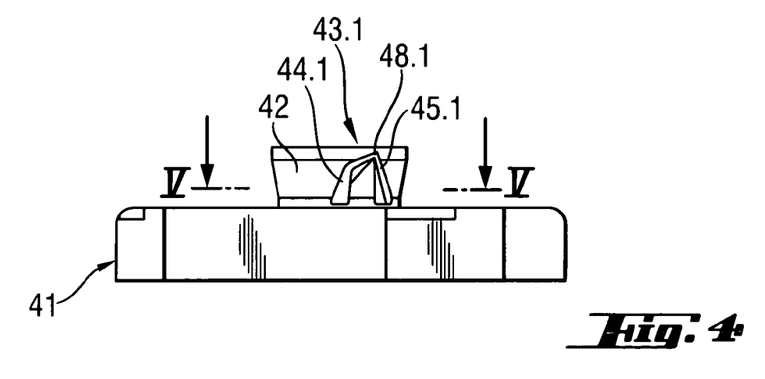
FIG. 4 represents a side view on another slotted member design.

FIG. 4 represents a side view on another slotted member design. The rear grip part 41 is provided with a shaft 42 on which two diametrically opposed slotted members 43.1 (and 43.2 not shown here) are arranged. The slotted member 43.1 has a first slotted member segment 44.1 and a second slotted member segment 45.1, wherein the second slotted member segment 45.1 has an inclination running opposite to the inclination of the first slotted member segment 44.1 and connects to the first slotted member segment 44.1.

Figure 5A:
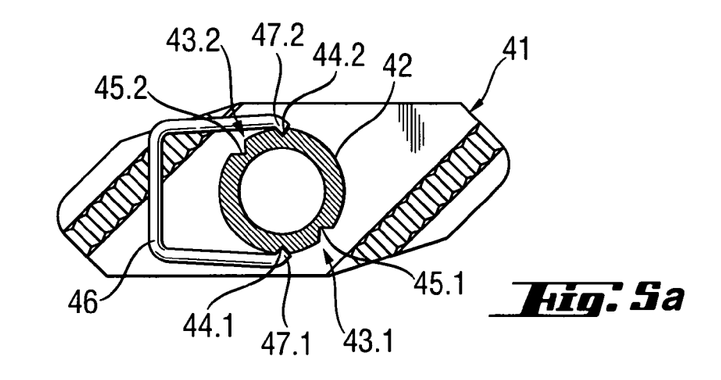
FIG. 5a, 5b each represents a top view, in part in cross-section, along the line V—V of FIG. 4.
Figure 5B:
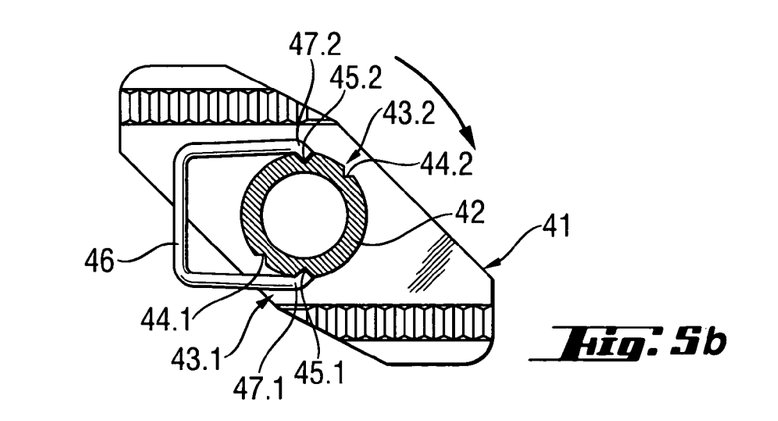

A view along the line of section V—V of FIG. 4 is represented in FIGS. 5a and 5b.

In the transport position of the rear grip part 41 represented in FIGS. 5a and 5b, the spring clip 46 engages at the starting point of the respective first slotted member segment, e.g. 44.1. By virtue of the translatory movement of the fastening means, the free ends 47.1 and 47.2 of the spring clip glide along the bottom of the slotted member segment 44.1 or 44.2, whereby the rear grip part 41 is urged into the inside of the hollow body 2 and at the same time rotated under the mounting projections of the hollow body 2. Once the inflection point of the slotted member 43.1 and 43.2, for example the inflection point 48.1 of the slotted member 43.1, is reached, the free ends 47.1 and 47.2 glide into the second slotted member segments 45.1 and 45.2, as represented in FIG. 5b. When this is done, the rear grip part 41 raises under the mounting projections in the direction of the stop, until the rear grip part engages with the mounting projections of the hollow body.

Figure 6:
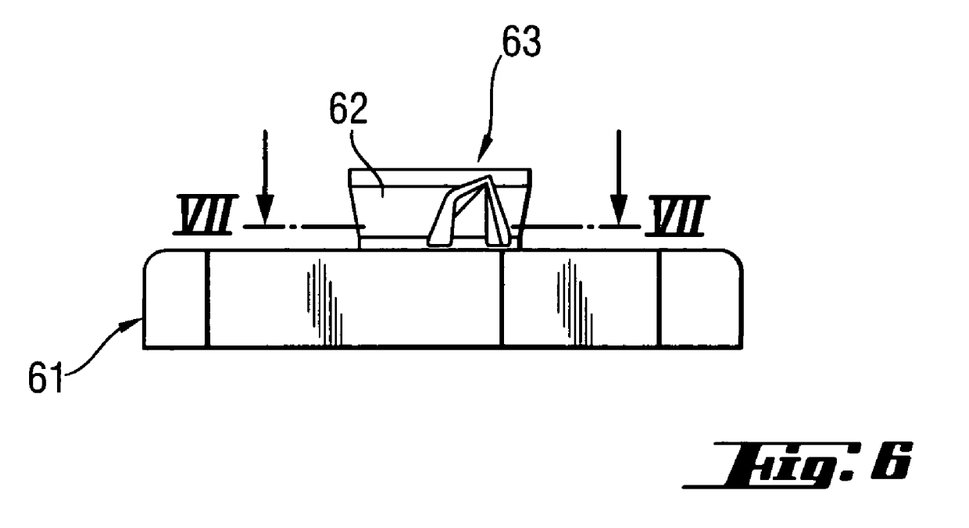
FIG. 6 represents a side view on another slotted member design.

FIG. 6 represents a side view on another slotted member design. The rear grip part 61 has, in contrast with the rear grip part described previously in FIG. 4, only one slotted member 63 on the shaft 62, which is configured like the slotted members 43.1 and 43.2.

Figure 7:
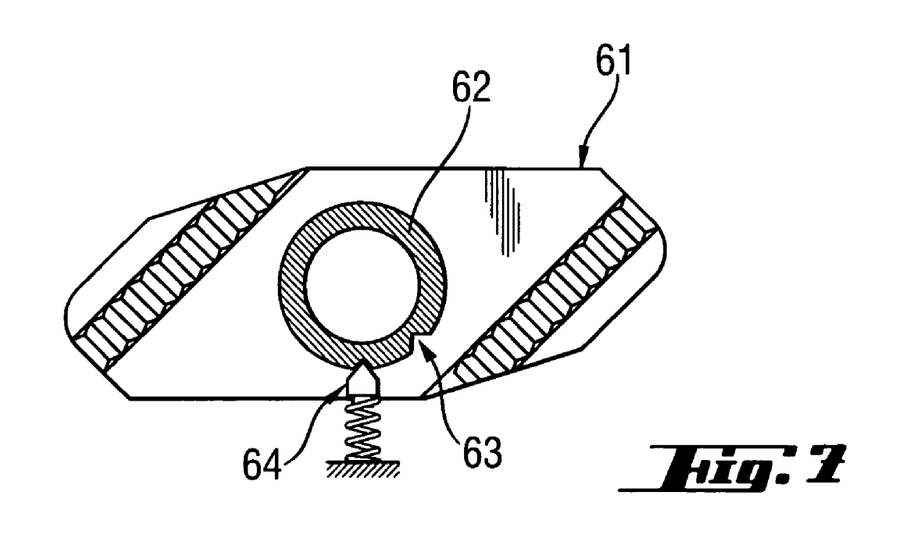
FIG. 7 represents a top view in partial cross-section along the line VII—VII of FIG. 6.

FIG. 7 represents a view along the section line VII—VII of FIG. 6. In lieu of a grip by means of a spring clip, the slotted member 63 is gripped by a spring-loaded guide tip 64.

In summary, it is stated that an easy to use, easy to install fastening system having a rotatable rear grip part is provided, which makes possible a preliminary fixation, which assures correct positioning of the rear grip part relative to the mounting projections.

What is claimed is:

1. A fastening system comprising a rear grip part (5,41, 61) to be inserted and secured within an elongated hollow body (2), said elongated hollow body having an elongated first side containing a mounting opening (4) extending in the elongated direction of said hollow body, said rear grip part (5,41,61) insertable in a first position through said mounting opening (4) into said hollow body and displaceable therein into a second position for gripping with mounting projections (6.1, 6.2) within said hollow body (2), said mounting projections extending in the elongated direction of said hollow body, at least one stop (3) positioned exteriorly on the first side of said hollow body along and extending laterally outwardly from opposite sides of said mounting opening, said stop (3) connected to said rear grip part (5, 41, 61) by a fastening means (9) having an axis extending through said stop into said rear grip part whereby a relative rotary movement between the stop (3) and said rear grip part (5, 41, 61) about the axis of said fastening means (9) can be effected, wherein the fastening system includes a transmission system for converting a translatory movement of said fastening means relative to said stop (3) during the translatory movement into a rotational movement of said rear grip part (5, 41, 61) relative to said stop (3), wherein said transmission system comprises a slotted member (22.1; 22.2; 31.1; 31.2; 43.1; 43.2; 63) and a spring-loaded element (7; 34; 46; 64), wherein said spring-loaded element (7, 34, 46, 64) engages in the slotted member (22.1; 22.2; 31.1; 31.2; 43.1; 43.2; 63), wherein said grip part (5, 41, 61) comprises a shaft (8, 42, 62) extending parallel to the axis of said fastening means (9), said slotted member (22.1; 22.2; 31.1; 31.2; 43.1; 43.2; 63) of said transmission system is formed on said shaft (8; 42; 62) and said slotted member (22.1; 22.2; 31.1; 31.2; 43.1; 43.2; 63) comprises a planar surface part (24.1; 24.2), wherein said slotted member (22.1; 22.2; 31.1; 31.2; 43.1; 43.2; 63) comprises a groove, and wherein at least one of said groove and said planar surface part (24.1; 24.2) is shaped helicoidally.

2. A fastening system comprising a rear grip part (5,41, 61) to be inserted and secured within an elongated hollow body (2), said elongated hollow body having an elongated first side containing a mounting opening (4) extending in the elongated direction of said hollow body, said rear grip part (5,41,61) insertable in a first position through said mounting opening (4) into said hollow body and displaceable therein into a second position for gripping with mounting projections (6.1, 6.2) within said hollow body (2), said mounting projections extending in the elongated direction of said hollow body, at least one stop (3) positioned exteriorly on the first side of said hollow body along and extending laterally outwardly from opposite sides of said mounting opening, said stop (3) connected to said rear grip part (5, 41, 61) by a fastening means (9) having an axis extending through said stop into said rear grip part whereby a relative rotary movement between the stop (3) and said rear grip part (5, 41, 61) about the axis of said fastening means (9) can be effected, wherein the fastening system includes a transmission system for converting a translatory movement of said fastening means relative to said stop (3) during the translatory movement into a rotational movement of said rear grip part (5, 41, 61) relative to said stop (3), said transmission system comprises at least two slotted member segments (44.1; 44.2; 45.1; 45.2) wherein a first slotted member segment (44.1; 44.2) has an axially increasing inclination, and at least a second slotted member segment (45.1; 45.2) has an inclination oriented opposite to the inclination of said first slotted member segment (44.1; 44.2) and said second slotted member segment (45.1; 45.2) abuts said first slotted member segment (44.1; 44.2).

3. A fastening system as set forth in claim 2, wherein said second slotted member segment runs parallel to the axis of said fastening means.

4. A fastening system as set forth in claim 2, wherein a spring loaded element (11) is provided between said fastening means (9) and said stop (3).

* * * * *